United States Patent
Lee et al.

(10) Patent No.: US 9,426,016 B2
(45) Date of Patent: Aug. 23, 2016

(54) SELF TRACK SCHEME FOR MULTI FREQUENCY BAND SERIALIZER DE-SERIALIZER I/O CIRCUITS

(71) Applicant: THE REGENTS OF THE UNIVERSITY OF CALIFORNIA, Oakland, CA (US)

(72) Inventors: Sheau Jiung Lee, Saratoga, CA (US); Mau-Chung Frank Chang, Los Angeles, CA (US); Yanghyo Kim, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 14/704,694

(22) Filed: May 5, 2015

(65) Prior Publication Data

US 2015/0312083 A1    Oct. 29, 2015

Related U.S. Application Data

(63) Continuation of application No. PCT/US2013/066194, filed on Oct. 22, 2013.

(60) Provisional application No. 61/723,284, filed on Nov. 6, 2012.

(51) Int. Cl.
| | | |
|---|---|---|
| *H04M 11/06* | (2006.01) | |
| *H04L 27/38* | (2006.01) | |
| *G06F 13/40* | (2006.01) | |
| *G06F 5/16* | (2006.01) | |
| *H04L 27/36* | (2006.01) | |

(52) U.S. Cl.
CPC ........ *H04L 27/38* (2013.01); *G06F 5/16* (2013.01); *G06F 13/4059* (2013.01); *G06F 13/4072* (2013.01); *H04L 27/364* (2013.01)

(58) Field of Classification Search
USPC ............................................ 375/222; 398/79
See application file for complete search history.

(56) References Cited

U.S. PATENT DOCUMENTS 3,855,422 A * 12/1974 Cadiou .................. H04J 3/242
                                                                 370/470
2005/0281193 A1    12/2005 Hofmeister et al.
2009/0147896 A1    6/2009 Frankel et al.
(Continued)

OTHER PUBLICATIONS

Korea Intellectual Property Office (KIPO), International Search Report and Written Opinion, PCT/US2013/066194, Feb. 10, 2014 (pp. 1-12) with claims searched (pp. 13-17), counterpart to U.S. Appl. No. 14/704,694 herein.

*Primary Examiner* — Eva Puente
(74) *Attorney, Agent, or Firm* — O'Banion & Ritchey LLP; John P. O'Banion

(57) ABSTRACT

A serializer and de-serializer circuit having self tracking circuitry which is particularly well-suited for use in communicating digital data from one integrated circuit (chip) to another for implementing chip-to-chip communications is presented. The circuits are scalable and utilize a multi-frequency modulation mechanism (e.g., QAM) for converting digital data bits into a serial analog stream at multiple frequencies for communication over a chip I/O connection. The track pulse generated on the transmitter side is serialized through the same path as the data, and demodulated through the same path in the de-serializer to provide synchronization with the data, without the need for complicated base band processing.

20 Claims, 4 Drawing Sheets

(56) References Cited

U.S. PATENT DOCUMENTS

| | | | |
|---|---|---|---|
| 2009/0180778 A1* | 7/2009 | Rhee | H04B 10/548 398/79 |
| 2010/0098438 A1* | 4/2010 | Prat Goma | H04B 10/61 398/203 |
| 2010/0117876 A1 | 5/2010 | Cao et al. | |
| 2011/0081872 A1 | 4/2011 | Bar-Sade et al. | |
| 2012/0007756 A1 | 1/2012 | Agazzi | |
| 2013/0209091 A1* | 8/2013 | Mateosky | H04B 10/07953 398/26 |

* cited by examiner

SELF TRACK SCHEME FOR MULTI FREQUENCY BAND SERIALIZER DE-SERIALIZER I/O CIRCUITS

CROSS-REFERENCE TO RELATED APPLICATIONS

This application is a 35 U.S.C. §111(a) continuation of PCT international application number PCT/US2013/066194 filed on Oct. 22, 2013, incorporated herein by reference in its entirety, which claims priority to, and the benefit of, U.S. provisional patent application Ser. No. 61/723,284 filed on Nov. 6, 2012, incorporated herein by reference in its entirety. Priority is claimed to each of the foregoing applications.

The above-referenced PCT international application was published as PCT International Publication No. WO 2014/074301 on May 15, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED IN A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to chip-to-chip communications, and more particularly to a self tracking serializer de-serializer.

2. Description of Related Art

Conventional serializer de-serializer I/O is based on multiplexing and demultiplexing digital communications. Using such conventional schemes to increase communications bandwidth requires increasing clock rate.

Attempting to use multi-frequency bands in a traditional scheme for modulation and demodulation to overcome the above problems brings up additional issues. Current multi-frequency serializers and de-serializers for use with chip-to-chip I/O include modulation and demodulation that are complicated and dependent on external factors, such as silicon process, connection conditions, power supply quality, and the like. In these conventional systems, a complicated scheme, such as error correction or base band processing is required to achieve reliable modulation and demodulation with low bit error rate. When the latency of modulation and demodulation becomes critical in the I/O connection, the traditional base band processing, used to ensure low bit-error-rate (BER), in modulation and demodulation becomes impractical.

The use of base band processing techniques can in some cases provide for reliable data transmission and reception, yet it comes with a high cost penalty regarding circuit complexity and unnecessarily long delays for data processing. Although the typical multi-frequency approach may be suitable for high throughput operations, it is not well suited when short latencies are required to perform mission critical operations.

Accordingly, a need exists for chip-to-chip multi-frequency communication circuits that have short latencies and are readily implemented. The present invention fulfills these needs, and overcomes shortcomings of previous multi-frequency chip-to-chip communication topologies.

BRIEF SUMMARY OF THE INVENTION

A chip-to-chip serializer and de-serializer are described which utilize a self tracking method based on track pulse generation on the transmitter (TX) and track pulse restoration on the receiver (RX). The data to be transmitted is synchronized with the generated track pulse on TX, with the transmitted data and track pulse being modulated at the same time in the TX. All signals communicated chip-to-chip utilizing the present invention are processed under the same conditions, including silicon process variation, power noise, critical path delay, and so forth, thus eliminating/reducing the impact of these variables on operation of the serializer de-serializer.

Utilizing the inventive self-tracking serializer de-serializer, one can reach the performance limitation for any given technology by not only increasing the data throughput, but in response to also reducing data transfer latency.

The signals are serialized, modulated and transmitted through a short I/O connection from transmitter (TX) to receiver (RX). The RX also demodulates all signals under the same conditions and characteristics of the receiver. The track pulse is restored in the RX after demodulation. Because the data and track pulse are synchronized in the TX, the signals should likewise be synchronized in the RX when all signals are processed with identical demodulation. Once the track pulse is restored, the self track scheme can sample the restored data at the correct timing. The sample timing tracks the external factors even under different operating conditions, use of different integrated circuit chips or different process technology. The next level of synchronization with the system bus after the signal is sampled in the analog-to-digital converter (ADC) which can also be processed based on the timing of restored track pulse.

The restored track pulse can experience significant jitter in practice. By further use of over-sampling techniques to build a restored track pulse, the implementation provides an improved large jitter tolerance.

The inventive self tracking serializer de-serializer provides significant improvements to the yield of chip-to-chip I/O circuits. The inventive system can be ported to fabricate devices compatible with future silicon process advancements, such as from 28 nm nodes to 14 or 20 nm nodes with minor effort.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

A self tracking serializer de-serializer is described in which a track pulse is generated which travels along with the digital data through serialization and modulation at the transmitter (i.e., first chip) and the demodulation and de-serialization at the receiver (i.e., second chip). This self tracking ability allows one to build a circuit with minimum timing overhead without complicated base band processing, while performance and device yield are achieved with low circuit overhead. Integrated circuits can be fabricated using this self track mechanism in any desired device technology or process, including 28 nm or use of advanced silicon process technologies.

Figure 1A:
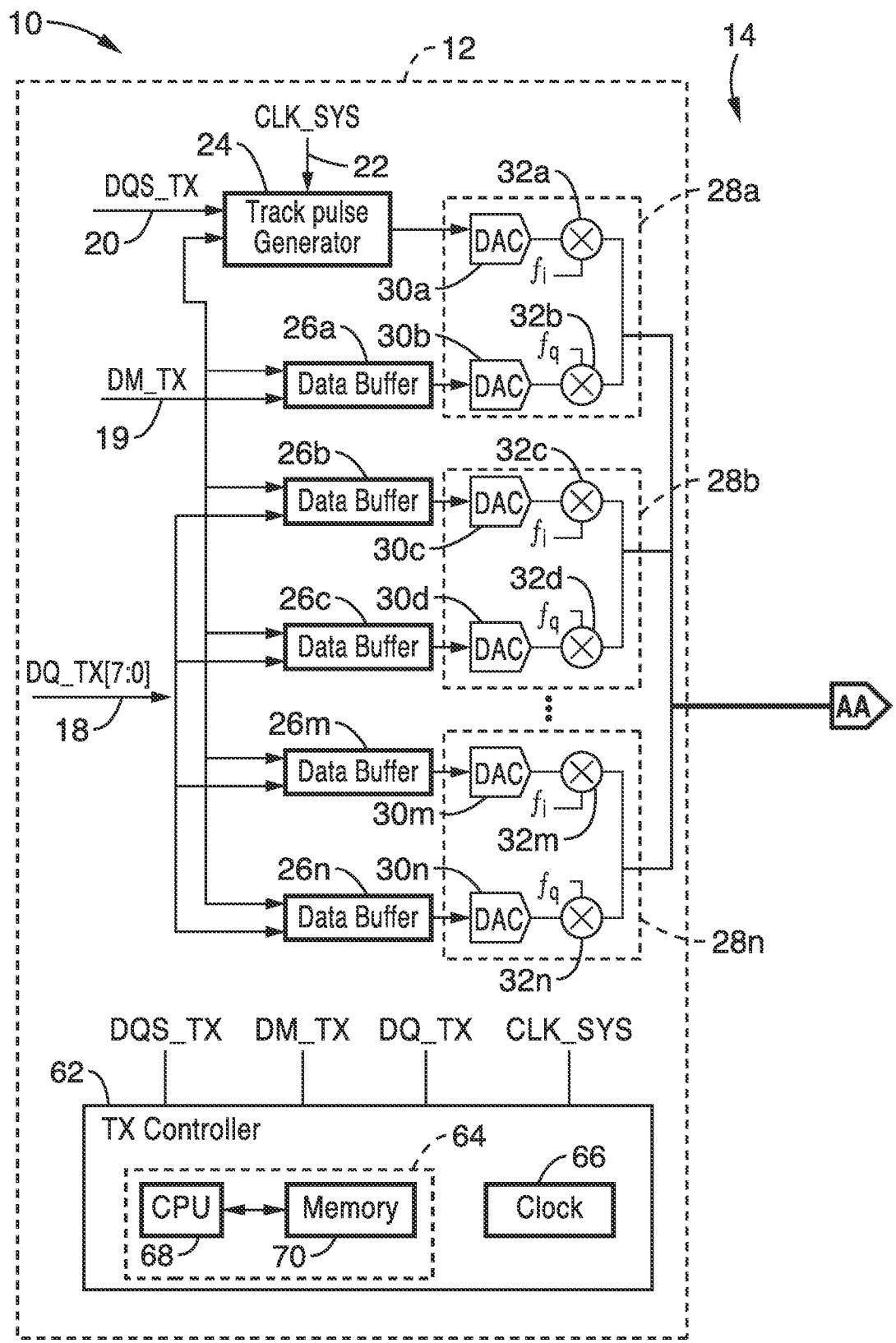
FIG. 1A and FIG. 1B is a block diagram of a self-tracking multi-frequency band serializer and de-serializer according to an embodiment of the present invention.
Figure 1B:
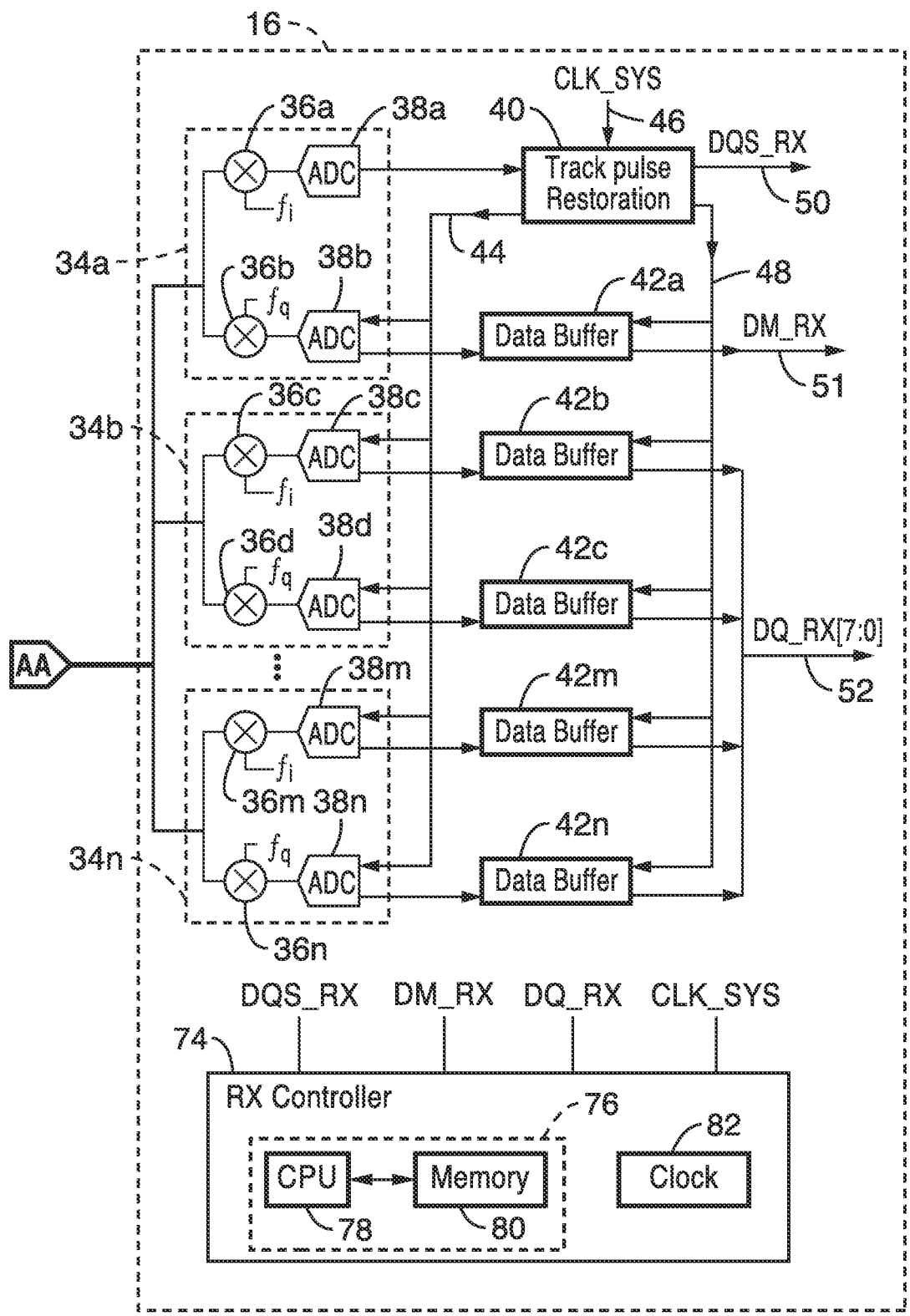

FIG. 1A and FIG. 1B illustrate an example embodiment 10 for a self tracking multi-frequency band serializer and de-serializer, shown for communicating between a transmitter (TX) in a first chip 12 seen in FIG. 1A over an I/O channel 14, to a receiver (RX) in a second chip 16 seen in FIG. 1B.

Digital data 18 (DQ_TX) and byte mask 19 (DM_TX) is seen received in the TX in FIG. 1A. The byte mask is utilized when the data word to be communicated is sent in multiple sections (e.g., 16 bits over the 8 bit path shown in FIG. 1A, FIG. 1B). Although the example embodiment often describes a structure allowing sending of 8 bits of digital data (e.g., [7:0]), it will be appreciated that the present invention can be configured with any desired number of bits (e.g., 16 bits, 32 bits, and so forth). However, this requires adding more data buffers, converters (DAC, ADC), and modulators and demodulators operating at more frequencies or with higher order encoding.

The transmitter controller asserts a synchronization signal 20 (DQS_TX) flag to trigger tracking and serialization. In any embodiment of the invention, the DQS_TX pulse traverses the whole propagation path to which the data is subject. A track pulse generator 24 receives synchronization signal 20 (DQS_TX) and a clock signal 22. The track pulse generator is configured to generate a synchronized pulse as the flag for data synchronization. It is shown in the figure that DQS_TX is also applied to a buffer for data mask (DM_TX) 19 and as a first input of the data buffers 26a, 26b, 26c, on through to 26m and 26n, which also receive bits within data DQ_TX 18 so that data synchronizes with the track pulse.

The track pulse and digital data word are serialized and modulated for transmission to the receiver. Bits of data DQ_TX 18 along with a track pulse from track pulse generator 24 at modulators 28a, 28b, through 28n. Each of these modulators is configured for converting the digital data to analog data which is encoded over multiple frequency channels, such as using multiple modulators which are each configured for operation at a different frequency (e.g., different carrier frequencies). It should be appreciated that one of these modulation frequencies can be zero, that is DC. Using DC as one modulation frequency can reduce the number of frequency generation circuits needed, including phase-locking circuits (e.g., PLL) which are needed. As these signals are well known with analog modulation and demodulation the circuits for generating them are not shown within controllers 62 and 74 in FIG. 1A and FIG. 1B, respectively. In one example, each modulator utilizes quadrature amplitude modulation (QAM) (e.g., QAM16) and has mixers which encode both an I channel and a Q channel of information into a given modulation frequency.

It will be appreciated that QAM, as described in this embodiment, is an analog modulation mechanism, which differs from digital multiplexing used in a digital serialization scheme. In analog QAM, two analog message signals are communicated on each frequency channel by changing (modulating) two carrier waves. The two carrier waves (typically sinusoids), are out of phase with each other by 90° and are thus called quadrature carriers. Output over a frequency channel is the sum of the modulated waves of phase modulation (PM) and amplitude modulation (AM). For the sake of simplicity of description, the internal circuitry for analog QAM is not described. It will be noted that a large number of QAM circuits are available and the technology is well known to one of ordinary skill in the art. It should be appreciated that a variety of forms of QAM are available and can be utilized with the present invention, some of the more common forms that can be selected for use include: QAM8, QAM16, QAM32, QAM64, QAM128, and QAM256. It will be appreciated that QAM distributes information in the I-Q plane evenly, and the higher orders of QAM involve information spaced more closely in the constellation. Thus, higher order QAM allows transmitting more bits per symbol, but if the energy of the constellation is to remain the same, the points on the constellation are closer together and the transmission becomes more susceptible to noise. It should also be appreciated that other forms of modulation (demodulation) can be utilized in the present invention without departing from the teachings herein. Examples of other forms of multi-frequency modulation which can be utilized include pulse-width modulation (PWM), frequency-shift keying (FSK), frequency-hopping, spread spectrum, and so forth.

During serialization and modulation in FIG. 1A, digital data is converted by digital-to-analog converter (DAC) 30a, 30b, resulting in analog outputs received at mixers 32a, 32b, through 32m, 32n along with 90 degree out-of-phase modulation carriers $f_i$ and $f_q$, respectively. In the example figures, each of the DACs is shown comprising a 2 bit DAC. It should be appreciated, however, that embodiments can be readily implemented using DACs with a different number of bits, such as 4 or more bits. Each of the modulators 28a, 28b through 28n operate at a different frequency, with the output of each being summed at the I/O channel 14 and thus travel through the same I/O connection for receipt at second chip 16. This configuration assures a close tracking of the data path through the same modulation process as the tracking signal, regardless of the various channel conditions of I/O channel 14.

In the receiver (RX) 16 seen in FIG. 1B, all signals are demodulated through the same path, exemplified with demodulators 34a, 34b through 34n, each operating at a different frequency within the multiple frequencies (e.g., which can include zero frequency (DC)). Using QAM demodulators, each demodulator receives the incoming analog signal at two mixers (e.g., 36a and 36b, 36c and 36d, on through to 36m and 36n) which also receives 90 degree out-of-phase modulation carriers $f_i$ and $f_q$, respectively. Demodulated output from each of the mixers is received by analog-to-digital converters (ADC) 38a, 38b through 38m, 38n. The output from the ADC is only collected in synchronous with the track pulse. By continuously sampling the ADC of the track pulse at the TX, this signal can be restored in the RX.

One of the ADCs is seen outputting digital data to a track pulse restore circuit 40, which operates in combination with output data buffers 42a, 42b, 42c, through 42m and 42n. A first output 44, comprises the restored track pulse itself used to synchronize the output from the ADCs to the data buffers. Track pulse restore circuit 40 receives a clock 46 (CLK_SYS), and outputs a synchronization signal (pulse) 48 for controlling the latching of data from the ADCs at each of the data buffers whose output is de-serialized digital data (DQ_RX) 52. Once data from the ADCs is latched to the data buffer, the track pulse restoration circuit sets a flag DQS_RX 50, signaling that the receiver controller can now read the DQ_RX data word. A byte mask (DM_RX) 51 is also generated for masking purposes when handling multiple bytes.

It will be seen that the track pulse and all data follow through the same path and time, thus allowing the track pulse restoration circuit to generate signals for controlling ADC output and latching of the data into the buffers with proper timing.

The above serializer and de-serializer are particularly well-suited for operation on a first chip and a second chip between which communication is to be established. It will be appreciated that a second I/O channel can be utilized for establishing a communication path in the opposite direction between the first and second chips. This first and second chips seen in FIG. 1A and FIG. 1B are each configured with a controller 62, 74, respectively, for controlling the transmit and receive side operations and generating the signals for operating the serializer and de-serializer. By way of example, and not limitation, the TX controller is shown having at least one processor circuit 64, comprising CPU 68 with memory 70, and utilizing a clock circuit 66. In a similar manner RX controller 74 is shown having at least one processor circuit 76, comprising CPU 78 with memory 80, and utilizing a clock circuit 82. It will be appreciated, however, that controller circuits can be implemented with various combinations of discrete and programmable logic circuits and processors, without departing from the teachings of the present invention.

Figure 2:
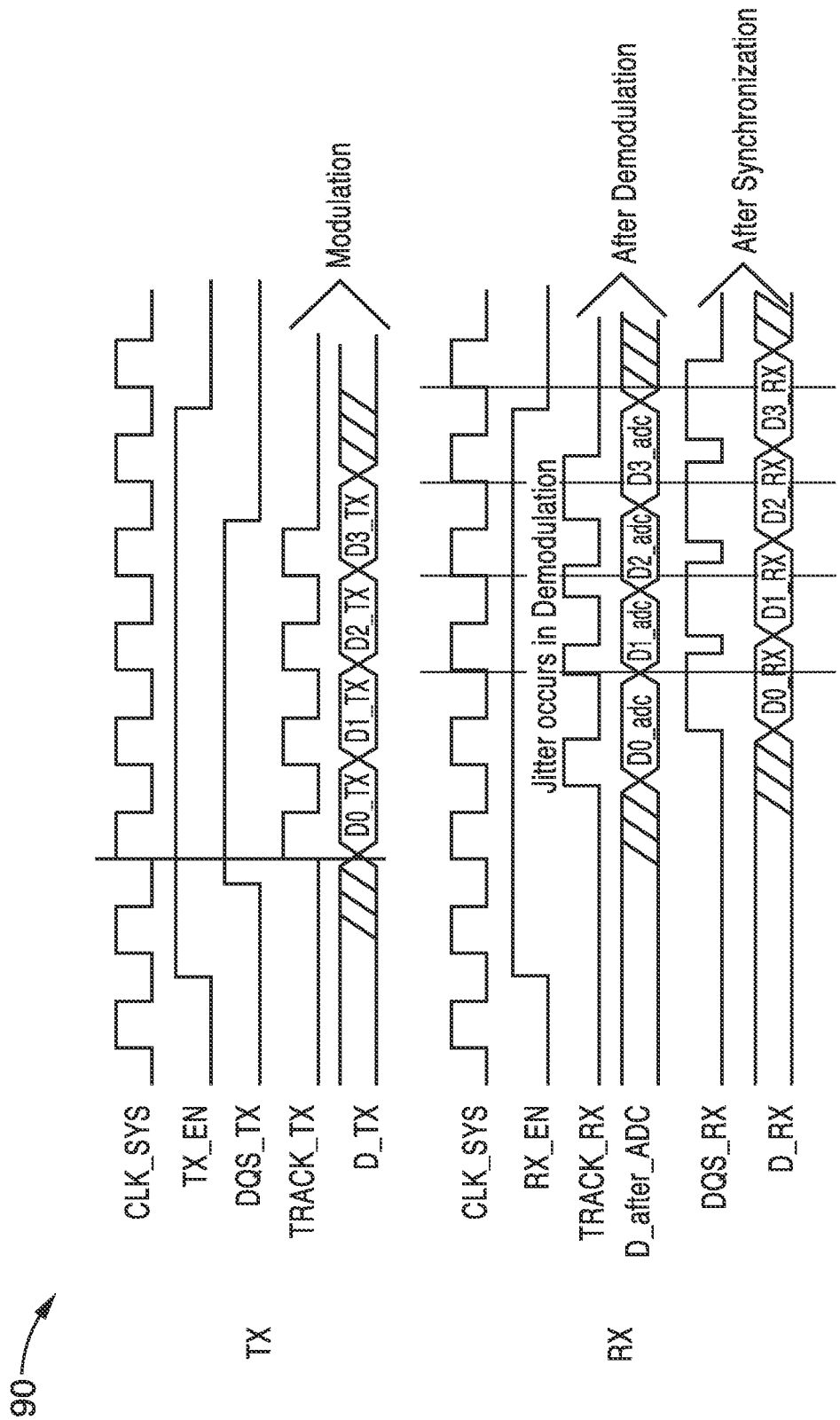
FIG. 2 is a timing diagram of track pulse generation and restoration within a self-tracking multi-frequency band serializer and de-serializer according to an embodiment of the present invention.

FIG. 2 illustrates an embodiment 90 of signal timing according to the invention as shown in FIG. 1 for serializing D_TX (e.g., D_TX [7:0]), for transmission from the first chip and upon receipt at the second chip performing deserialization back into D_RX (e.g., D_RX [7:0]). The upper portion of the figure shows signals on the transmitter (TX) while the lower section shows signals on the receiver (RX). A clock signal (CLK_SYS) is utilized for timing the various actions in the transmitter circuit. The rising edge of CLK_SYS is utilized to strobe DQS_RX and D_RX. A transmitter enable signal (TX_EN) enables data serialization and transmission. Upon asserting DQS_TX, the TRACK_TX pulses are generated to which all D_TX data operations are synchronized during modulation.

The lower portion of FIG. 2 depicts TRACK_RX and data D_RX being restored. A clock signal (CLK_SYS) is utilized for timing the various actions in the receiver circuit. A receiver enable signal (RX_EN) enables data deserialization. The TRACK_RX signal is shown experiencing jitter after demodulation. Data output from the ADCs is seen (D_after_ADC) after demodulation. The track pulse restore circuit will perform the restoration of data from the desired eye window and then synchronizes the data bus with the system clock. The DQS_RX flag signal is seen being generated as data words D_RX and are ready to be read by the receiver controller.

Figure 3:
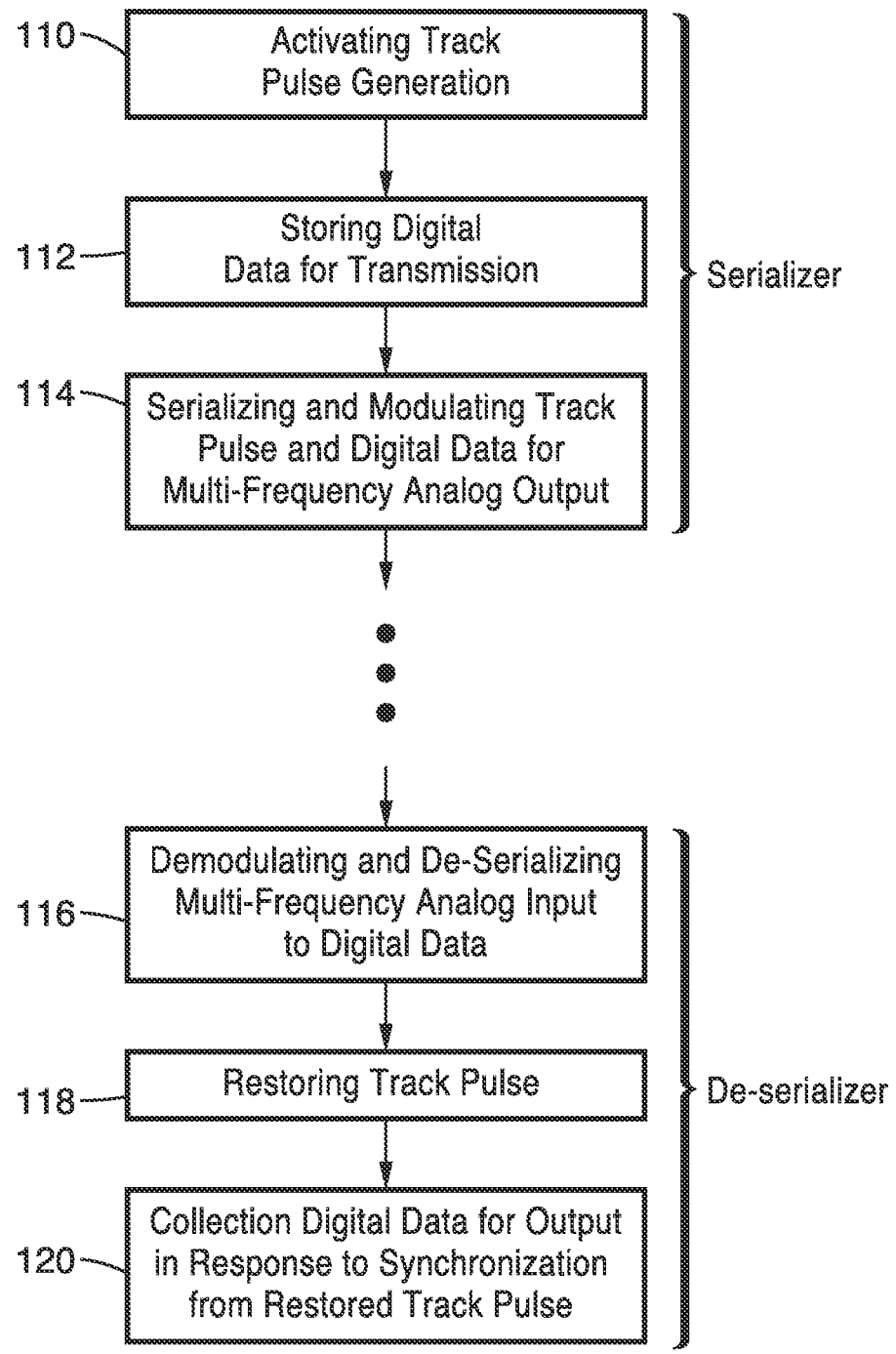
FIG. 3 is a flow diagram of a self tracking serializer de-serializer method according to an embodiment of the present invention.

FIG. 3 illustrates an example embodiment of the tracked method of serializing and de-serializing according to the invention. Beginning with step 110, a track pulse start signal is used for starting track pulse generation and storing 112 a digital data word into buffers for modulation and transmission. The track pulses and digital data word are serialized and modulated 114 into a multi-frequency analog output for receipt, such as on another chip, by a de-serializer. In the de-serializer, the multi-frequency analog is converted 116 back to a digital data word, and the track pulse is also restored 118. Synchronization signals are generated in response to the restored track pulse for collecting 120 the digital data word for output. It will be noted that synchronization signals are generated in response to the track pulse for: (1) triggering the digital output to the buffers from the ADCs, (2) latching digital data onto the buffers; and (3) signaling that a digital data word is ready.

From the discussion above it will be appreciated that the invention can be embodied in various ways, including the following:

1. An apparatus for serializing and de-serializing chip-to-chip communications, comprising: a serializer configured for serializing and modulating digital data bits, said serializer having a track pulse generator and data buffers whose digital data bit outputs are modulated by multiple modulators into multiple analog frequency signals configured for communication over an I/O channel to an off chip de-serializer; and a de-serializer having multiple demodulators configured for receiving said multiple analog frequency signals over the I/O channel and demodulating these signals for receipt by a track pulse restoration circuit and data buffers; wherein said track pulse restoration circuit generates synchronization signals for triggering output from said demodulators to said receiver data buffers, latching data into said receiver data buffers, and signaling that digital data bits can be read from said receiver data buffers.

2. The apparatus of any of the previous embodiments, wherein said modulator and said demodulator operate utilizing quadrature amplitude modulation (QAM).

3. The apparatus of any of the previous embodiments, wherein said modulator and said demodulator operate utilizing quadrature amplitude modulation (QAM), selected from the group of QAM orders consisting of QAM8, QAM16, QAM32, QAM64, QAM128 or QAM256.

4. The apparatus of any of the previous embodiments, wherein said quadrature amplitude modulation (QAM) encodes two analog message signals into carrier waves at its carrier frequency.

5. The apparatus of any of the previous embodiments, wherein said digital data bits comprises at least 8 bits.

6. An apparatus for serializing and de-serializing chip-to-chip communications, comprising: a track pulse generator, configured for generating track pulses, within a serializer configured for serializing words of digital data into multiple analog frequency signals for communication to an off chip de-serializer; multiple transmitter data buffers configured for receiving digital data bits; wherein said multiple transmitter data buffers load data bits in response to receipt of a synchronization signal which is also received at said track pulse generator; multiple modulator circuits, each modulator circuit operating at a different modulation frequency; said modulator circuits are configured for converting said track pulses and outputs from said multiple transmitter data buffers into an analog signal modulated into carriers signals at multiple frequencies for transmission to a de-serializer; and multiple demodulator circuits within a de-serializer configured for demodulating and de-serializing data from multiple analog frequency signals received from a serializer, and outputting digital data; wherein each demodulator circuit operates at a different modulation frequency; wherein said demodulator circuits are configured for converting analog signals modulated into carriers signals at multiple frequencies into words of digital data; a track pulse restoration circuit, configured for restoring the track pulse from the transmitter and generating multiple synchronization signals; multiple receiver data buffers configured for receiving digital data bits from said demodulator circuits; wherein output of digital data from each said demodulator is triggered in response to a first synchronization signal from said track pulse restoration circuit; wherein said digital data from each said demodulator is latched into each of said multiple receiver data buffers in response to receipt of a second synchronization signal from said track pulse restoration circuit; and wherein said digital data is read from said data buffers in response to a third synchronization signal from said track pulse restoration circuit.

7. The apparatus of any of the previous embodiments, wherein said modulation and demodulation utilizes quadrature amplitude modulation (QAM).

8. The apparatus of any of the previous embodiments, wherein said QAM is selected from the group of QAM orders consisting of QAM8, QAM16, QAM32, QAM64, QAM128 or QAM256.

9. The apparatus of any of the previous embodiments, wherein said quadrature amplitude modulation (QAM) encodes two analog message signals into carrier waves at each output frequency.

10. The apparatus of any of the previous embodiments, wherein said digital data bits comprises at least 8 bits.

11. A method for serializing and de-serializing chip-to-chip communications, comprising: generating track pulses within a serializer of a first device chip; storing a digital data word for transmission from the first device chip; serializing said track pulses and said digital data word and modulating them into multiple frequency analog signals for communication a de-serializer in a second chip; demodulating the multiple frequency analog signals received at a second device chip; performing restoration of the track pulse received from said first device chip; and controlling the collection of said digital data word into output buffers in response to synchronization signals timed in relation to restoration of the track pulse.

12. The method of any of the previous embodiments, wherein said storing a digital data word for transmission is performed with multiple transmitter data buffers which load data bits in response to receipt of a synchronization signal which is also received at a track pulse generator which generates said track pulses.

13. The method of any of the previous embodiments, wherein said serializing and modulating into multiple frequency analog signals is performed by multiple modulator circuits, each modulator circuit operating at a different modulation frequency.

14. The method of any of the previous embodiments, wherein each said modulator circuit contains digital-to-analog converters (DACs) coupled to modulating mixers.

15. The method of any of the previous embodiments, wherein said modulating and demodulating is performed in response to a quadrature amplitude modulation (QAM) technique.

16. The method of any of the previous embodiments, wherein said quadrature amplitude modulation (QAM) encodes two analog message signals into carrier waves at each output frequency.

17. The method of any of the previous embodiments, wherein said quadrature amplitude modulation (QAM) is selected from the group of QAM orders consisting of QAM8, QAM16, QAM32, QAM64, QAM128 or QAM256.

18. The method of any of the previous embodiments, wherein said de-serializing and demodulating from multiple frequency analog signals is performed by multiple demodulator circuits, each demodulator circuit operating at a different modulation frequency.

19. The method of any of the previous embodiments, wherein each said demodulator circuit contains analog-to-digital converters (ADCs) coupled to demodulating mixers.

20. The method of any of the previous embodiments, wherein said synchronization signals timed in relation to restoration of the track pulse, comprises: a first synchronization signal which triggers demodulator output of digital data to data buffers; a second synchronization signal which latches said digital data onto the data buffers; and a third synchronization signal which indicates that the latched digital data can be read from the buffers.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for serializing and de-serializing chip-to-chip communications, comprising:
   a serializer configured for serializing and modulating digital data bits, said serializer having a track pulse generator and data buffers whose digital data bit outputs are modulated by multiple modulators into multiple analog frequency signals configured for communication over an I/O channel to an off chip de-serializer; and
   a de-serializer having multiple demodulators configured for receiving said multiple analog frequency signals over the I/O channel and demodulating these signals for receipt by a track pulse restoration circuit and data buffers;
   wherein said track pulse restoration circuit generates synchronization signals for triggering output from said demodulators to said receiver data buffers, latching data into said receiver data buffers, and signaling that digital data bits can be read from said receiver data buffers.

2. The apparatus recited in claim 1, wherein said modulator and said demodulator operate utilizing quadrature amplitude modulation (QAM).

3. The apparatus recited in claim 1, wherein said modulator and said demodulator operate utilizing quadrature amplitude modulation (QAM), selected from the group of QAM orders consisting of QAM8, QAM16, QAM32, QAM64, QAM128 or QAM256.

4. The apparatus recited in claim 1:
wherein said modulator and said demodulator operate utilizing quadrature amplitude modulation (QAM); and
wherein said quadrature amplitude modulation (QAM) encodes two analog message signals into carrier waves at its carrier frequency.

5. The apparatus recited in claim 1, wherein said digital data bits comprise at least 8 bits.

6. An apparatus for serializing and de-serializing chip-to-chip communications, comprising:
a track pulse generator, configured for generating track pulses, within a serializer configured for serializing words of digital data into multiple analog frequency signals for communication to an off chip de-serializer;
multiple transmitter data buffers configured for receiving digital data bits;
wherein said multiple transmitter data buffers load data bits in response to receipt of a synchronization signal which is also received at said track pulse generator;
multiple modulator circuits, each modulator circuit operating at a different modulation frequency;
said modulator circuits are configured for converting said track pulses and outputs from said multiple transmitter data buffers into an analog signal modulated into carrier signals at multiple frequencies for transmission to a de-serializer;
multiple demodulator circuits within a de-serializer configured for demodulating and de-serializing data from multiple analog frequency signals received from a serializer, and outputting digital data;
wherein each demodulator circuit operates at a different modulation frequency; and
wherein said demodulator circuits are configured for converting analog signals modulated into carrier signals at multiple frequencies into words of digital data;
a track pulse restoration circuit, configured for restoring the track pulse from the transmitter and generating multiple synchronization signals; and
multiple receiver data buffers configured for receiving digital data bits from said demodulator circuits;
wherein output of digital data from each said demodulator is triggered in response to a first synchronization signal from said track pulse restoration circuit;
wherein said digital data from each said demodulator is latched into each of said multiple receiver data buffers in response to receipt of a second synchronization signal from said track pulse restoration circuit; and
wherein said digital data is read from said data buffers in response to a third synchronization signal from said track pulse restoration circuit.

7. The apparatus recited in claim 6, wherein said modulation and demodulation utilizes quadrature amplitude modulation (QAM).

8. The apparatus recited in claim 7, wherein said QAM is selected from the group of QAM orders consisting of QAM8, QAM16, QAM32, QAM64, QAM128 or QAM256.

9. The apparatus recited in claim 6:
wherein said modulator and said demodulator operate utilizing quadrature amplitude modulation (QAM); and
wherein said quadrature amplitude modulation (QAM) encodes two analog message signals into carrier waves at each output frequency.

10. The apparatus recited in claim 6, wherein said digital data bits comprises at least 8 bits.

11. A method for serializing and de-serializing chip-to-chip communications, comprising:
generating track pulses within a serializer of a first device chip;
storing a digital data word for transmission from the first device chip;
serializing said track pulses and said digital data word and modulating them into multiple frequency analog signals for communication a de-serializer in a second device chip;
demodulating the multiple frequency analog signals received at the second device chip;
performing restoration of the track pulse received from said first device chip; and
controlling the collection of data bits of said digital data word into output buffers in response to synchronization signals timed in relation to restoration of the track pulse.

12. The method recited in claim 11, wherein said storing a digital data word for transmission is performed with multiple transmitter data buffers which load data bits in response to receipt of a synchronization signal which is also received at a track pulse generator which generates said track pulses.

13. The method recited in claim 11, wherein said serializing and modulating into multiple frequency analog signals is performed by multiple modulator circuits, each modulator circuit operating at a different modulation frequency.

14. The method recited in claim 13, wherein each said modulator circuit contains digital-to-analog converters (DACs) coupled to modulating mixers.

15. The method recited in claim 11, wherein said modulating and demodulating is performed in response to a quadrature amplitude modulation (QAM) technique.

16. The method recited in claim 15, wherein said quadrature amplitude modulation (QAM) encodes two analog message signals into carrier waves at each output frequency.

17. The method recited in claim 15, wherein said quadrature amplitude modulation (QAM) is selected from the group of QAM orders consisting of QAM8, QAM16, QAM32, QAM64, QAM128 or QAM256.

18. The method recited in claim 11, wherein said de-serializing and demodulating from multiple frequency analog signals is performed by multiple demodulator circuits, each demodulator circuit operating at a different modulation frequency.

19. The method recited in claim 18, wherein each said demodulator circuit contains analog-to-digital converters (ADCs) coupled to demodulating mixers.

20. The method recited in claim 11, wherein said synchronization signals timed in relation to restoration of the track pulse, comprises:
a first synchronization signal which triggers demodulator output of digital data to data buffers;
a second synchronization signal which latches said digital data onto the data buffers; and
a third synchronization signal which indicates that the latched digital data can be read from the buffers.

* * * * *